3,484,680
Patented Dec. 16, 1969

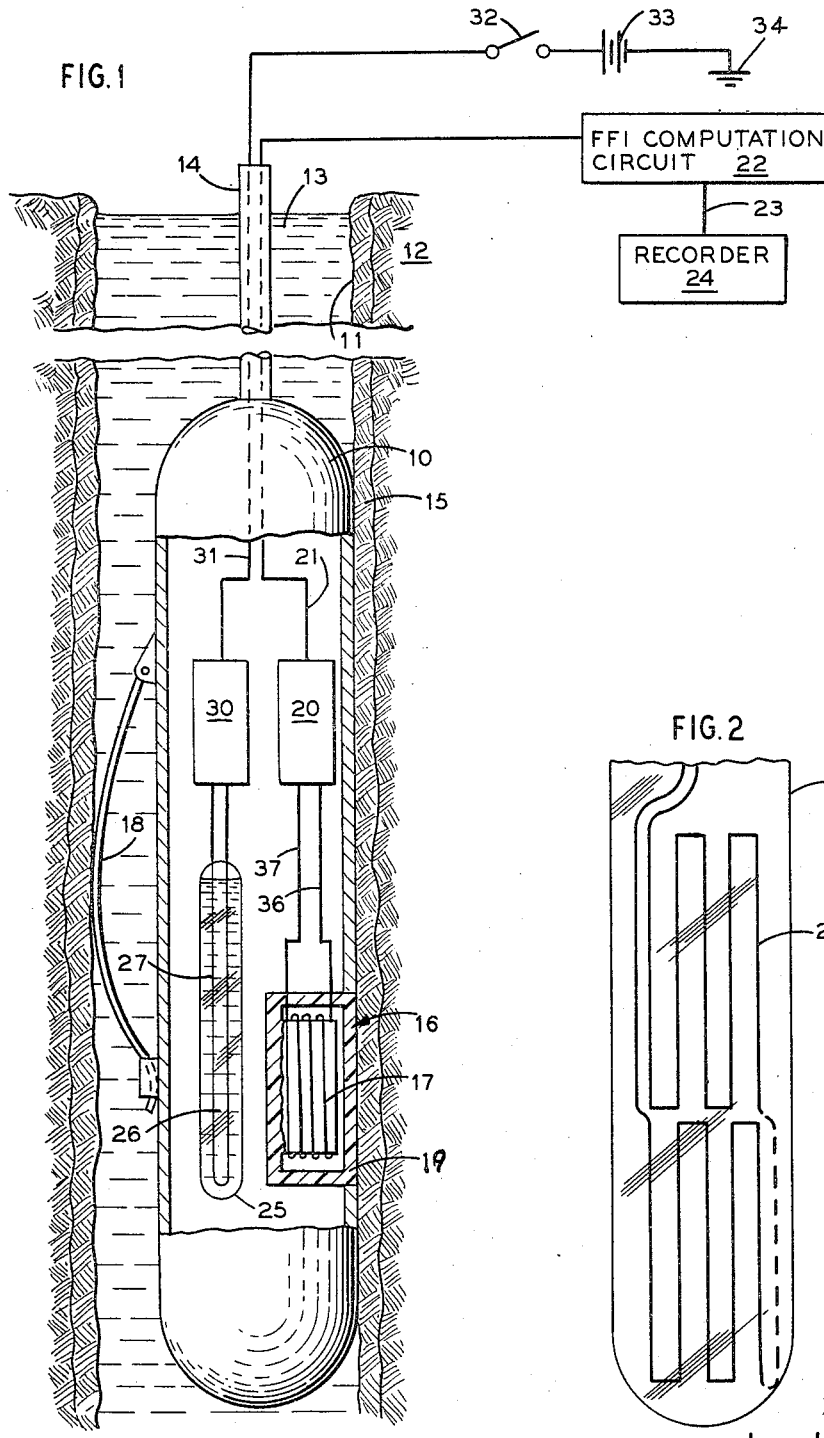

3,484,680
NUCLEAR MAGNETIC LOGGING SIGNAL
VERIFICATION TECHNIQUE
Loyal L. Hurlbert, Houston, Tex., assignor to Schlumberger Technology Corporation, New York, N.Y., a corporation of Texas
Filed May 25, 1967, Ser. No. 641,211
Int. Cl. G01n *27/00;* G01r *33/00*
U.S. Cl. 324—.5                                           2 Claims

ABSTRACT OF THE DISCLOSURE

One embodiment of the invention provides a proton sample within a nuclear magnetic resonance borehole logging tool to identify the presence of ferromagnetic particles within the environment adjacent to the tool. If no resonance signal is obtained from the formation, but a signal is produced by the proton sample, ferromagnetic particles probably are present in the formation and are responsible for suppressing the signal. A selectively energizable conductor within the proton sample enables the sample to be deactivated during logging in order to prevent interference between the sample and the resonance signals from the formation.

BACKGROUND OF THE INVENTION

Field of the invention

This invention relates to nuclear magnetic resonance techniques for material identification and, more particularly, to borehole logging equipment for identifying the presence of ferromagnetic substances in the earth formations under investigation, and the like.

DESCRIPTION OF THE PRIOR ART

Proposals have been advanced to identify magnetically polarizable materials through nuclear magnetic resonance techniques. A typical suggestion of this character generates an index of the freely movable fluids within an earth formation penetrated by a borehole. According to this latter suggestion, a tool for transport through the borehole has an axially elongated coil that is energized periodically to apply a strong magnetic field to the adjacent earth formation. The magnetic field polarizes, or aligns, some of the magnetic moments of hydrogen nuclei, or protons, within the formation essentially in the direction of the applied field.

By de-energizing the coil, the field is dissipated. With suitable removal of this applied field, the aligned protons once more shift their magnetic orientation and precess about the earth's magnetic field for a short while. This precession of the free protons induces a current in the coil that can be manipulated to indicate the abundance of relatively free hydrogen nuclei within the formation.

Hydrogen nuclei that are a part of the formation mineral structure; in high viscosity formation fluids; or close to the mineral structure in small pore volumes; or influenced by ferromagnetic or paramagnetic fields, do not contribute to the signal since the protons precess at many different frequencies and are not detected by the instrument. Consequently, the induced signal is a measure, generally, of only those nuclei that are free to be displaced or, in effect, an index of the movable or extractable fluids within the formation under study.

Proposals of this character are disclosed in more complete detail in John H. Baker, Jr., U.S. patent application Ser. No. 537,475, filed Mar. 25, 1966 for Nuclear Magnetism Logging System, and U.S. patent application Ser. No. 599,527, filed Dec. 6, 1966 for Nuclear Magnetism Signal Analyzing System, which are assigned to the same assignee as the invention described herein.

Certain physical conditions are encountered in the borehole environment that tend to distort or suppress the relatively weak signals emitted by the precessing hydrogen nuclei. In this connection, the magnetic properties of lodestone or magnetite ($Fe_3O_4$) and other of the aforementioned conditions, if present in the formation, often effectively distort the signal emitted by the precessing free protons. During actual logging operations, however, signal suppression confronts geologists and petroleum engineers as an ambiguous condition indicating that the tool either is out of order, or is being drawn through a signal-distorting formation. In this situation, valuable logging time will be lost if the tool is withdrawn from the borehole only to find that it is capable of functioning properly and that signal suppression was due to some characteristic of the formation. Accordingly, there is a need to check nuclear magnetic logging tool response while the tool is in the borehole, in order to determine if the signal from the tool is lost due to a tool malfunction or the presence of some characteristic, such as magnetite or the like, in the formation.

It is an object of the invention to provide an improved nuclear magnetic well logging tool.

It is still another object of the invention to provide an improved means for checking tool response while the tool is in the borehole.

It is a further object of the invention to provide an improved apparatus that will permit magnetite and other feromagnetic materials to be identified in an earth formation.

SUMMARY

In accordance wtih the invention, a proton sample is placed within a nuclear magnetic resonance logging tool housing. Means are provided to selectively activate or deactivate the proton sample in order to distinguish signal suppression caused by earth formation conditions from that which is caused by equipment malfunction.

Thus, if the earth formation signal from a nuclear magnetic resonance tool is suppressed, the proton sample within the well logging tool housing can be activated. If, after sample activation, a signal characterizing the proton sample is registered in recording equipment on the earth's surface, it is clear that the tool is in proper operating condition and that the formation signal probably was lost because of the influence of some environmental characteristic, for example, magnetite in the formation. If, however, no signal is provided by the proton sample, it can be inferred that the suppression of the signal is due to some malfunction in the logging system.

More particularly, a downhole logging tool is provided with an axially elongated coil for periodically applying a polarizing magnetic field to an earth formation. A switch and amplification circuit within the tool alternately energizes and de-energizes the coil to enable the hydrogen nuclei within the formation to polarize and then precess under the influence of the earth's magnetic field. The proton precession induces a signal in the coil that characterizes the free fluid within the formation.

A bottle containing a sample of relatively free protons, such as water or some other hydrogenous fluid, is placed within the housing adjacent to the coil. During logging the proton sample is effectively deactivated through a local magnetic field established within the bottle by a fine wire grid that traverses the bottle interior.

As the housing and coil are drawn into a mangetite-bearing formation, the free fluid index signal observed at the earth's surface is suppressed. In order to verify that the signal was lost because of the characteristics of the earth formation, rather than through an equipment malfunction, the proton sample is activated by de-energizing the local magnetic field within the bottle. If the logging equipment is in proper working order, the proton sample will induce an observable signal in the polarizing field coil. In this circumstance, the tool may be drawn further through the borehole until formations are encountered that do not contain magnetite. If, however, the proton sample signal is not observed, it reasonably can be inferred that the logging equipment is at fault.

With these and other objects in mind, the features and advantages of the present invention will be best understood from the following description when read in conjunction with the accompanying drawings. It will be understood that the description and accompanying drawings are for the purposes of illustrating a preferred embodiment and not to be construed as defining the scope or limits of the invention, reference being had for the latter purpose to the appended claims.

BRIEF DESCRIPTION OF THE DRAWING

FIG. 1 shows a borehole logging tool in partial section and the electrical circuits associated therewith in block diagram form, in accordance with one embodiment of the invention; and FIG. 2 is a schematic diagram of the fine wire structure within the proton sample bottle according to the embodiment of the invention shown in FIG. 1.

DESCRIPTION OF THE PREFERRED EMBODIMENTS

An illustrative embodiment of an apparatus for practicing the invention is shown in FIG. 1.

The apparatus comprises a fluid-tight pressure resistant housing 10 adapted to pass through a borehole 11 that traverses earth formations 12. The borehole 11 is filled with a water-base or oil-base drilling mud 13, as shown. Housing 10 is suspended in the borehole 11 by an armored cable 14 which may contain a group of insulated conductors (not individually shown) for transmitting power to the tool and signals to the earth's surface. A winch (not shown) located at the surface of the earth is used to lower and raise the housing in the borehole in the customary manner to traverse the earth formations 12. The borehole 11 is lined with a mudcake 15.

The lowermost portion of the housing 10 encloses a nuclear magnetic logging device 16 that is biased against the mudcake 15 by a bowspring 18, or the like. The nuclear magnetic logging device 16 has a coil 17 adjacent to one side of the housing 10. The coil 17 is encased in a non-magnetic insert 19 formed, for example, from a rigid plastic material. A magnetic field is produced in the formation 12 by the coil 17 that causes some of the magnetic moments of the hydrogen nuclei to polarize, or align essentially in the direction of the applied magnetic field. Accordingly, the responding protons largely provide a measure of the movable hydrogenous fluid within the earth formation 12.

To measure this latter quantity, the applied magnetic field is turned off after the relatively free protons in the formation have polarized. Upon termination of the applied field, these polarized hydrogen nuclei commence to precess, in the manner of a gyroscope, about the earth's magnetic field and in so precessing, induce a current in the coil 17. Appropriate manipulation of the induced current provides a signal that corresponds to the free fluid index for the formation 12, as described in more complete detail in the aforementioned John H. Baker, Jr. patent applications.

Thus, the signal induced in the coil 17 by the hydrogenous fluid in the formation 12 is processed for transmission to the earth's surface in a switch unit and amplifier circuit 20, which also provides the power that energizes the coil 17 in order to establish the initial polarizing field. The processed signal is transmitted from the circuit 20 up the borehole 11 through a conductor 21 in the cable 14 to a free fluid index computation circuit 22. The computation circuit 22 applies a signal to an output conductor 23 that corresponds to the free fluid index of the liquids within the earth formation 12.

A recorder 24 responds to the signals in the conductor 23 by producing a graph of the free fluid index of the formation 12 as a function of the depth of the housing 10 within the borehole 11. If the formation 12 is not subject to some ferromagnetic or paramagnetic influence, the well logging tool will function in the manner just described.

If magnetite or the like is within the formation 12, the proton precession signal will be distorted and effectively suppressed. The loss of the free fluid index signal is apparent immediately on examination of the graph at the recorder 24. As hereinbefore considered, the suppression of the signal raises an inference that the tool is out of commission or that magnetite is present in the formation. Ordinarily, it would be necessary to withdraw the housing 10 from the borehole 11 for inspection in order to determine the reason for the lost signal.

In accordance with the invention, the condition of the tool can be checked in the borehole 11 without withdrawing the housing 10 and wasting valuable logging time. Accordingly, a bottle 25 of some suitable substance that will not produce a nuclear magnetic resonance signal, for example, polyethylene or polypropylene, contains a portion sample 26 such as water, or some other hydrogenous fluid.

Thus, if the proton precession signal from the relatively free hydrogen nuclei in the formation 12 is suppressed and a signal is nevertheless observed from the sample 26 in the bottle 25, it is clear that the well logging tool is in correct working order and that the suppression of the signal from the formation 12 is due to some inherent property of the tool environment.

In this situation, it will not be necessary to withdraw the tool from the borehole 11 for inspection. Logging may continue as the tool is drawn upwardly through the borehole until the magnetite-bearing formation or other environmental condition is passed and a measurable hydrogen precession signal from the formation is restored. If, however, no signal is obtained through the excitation of the protons in the sample 26, it is likely that the logging tool is malfunctioning. In this latter circumstance, logging is discontinued and the housing 10 is withdrawn from the borehole as quickly as possible for necessary inspection and repair on the earth's surface.

To prevent the proton sample 26 from influencing or distorting the signal induced in the coil 17 during routine logging operations, a fine wire 27 (FIG. 2) which is arranged illustratively in the form of a grid, traverses the interior length of the bottle 25. Thus, the wire 27 is immersed in and insulated from the liquid proton sample 26.

To suppress an interfering signal from the proton sample 26 during formation logging, a switch 32 is operated on the earth's surface to energize the wire 27 through a path that includes ground 34, battery 33, operated switch 32, conductor 31 in the cable 14 and a relay circuit 30 in the housing 10 to a ground (not shown).

The energizing relay circuit 30 applies a potential to the wire 27 that enables current to flow through the wire and establish a magnetic field. The current in the wire 27 in the bottle 25 causes the protons in the sample 26 to produce a signal that subsides rapidly. The rapid subsidence of the signal from the proton sample will not distort the signal that characterizes the formation fluids.

As shown in FIG. 2, the current in the wire 27 flows in opposite directions in adjacent parallel segments. Consequently, the magnetic fields associated with each parallel segment of the wire 27 are in opposition, and thereby reduce the influence of the magnetic field to a local effect generally within the confines of the bottle 25.

Typically, a 10 ma. (milliampere) direct current applied to the wire 27 establishes a sufficiently strong magnetic field within the bottle 27 to prevent the protons in the sample 26 from generating a signal that interferes with the signal from the formation 12. In this connection, the wire 27 within the bottle 25 is disposed to interfere with the earth's natural magnetic field as little as possible, as hereinbefore considered.

If the signal from the formation 12 is suppressed, and no signal is obtained from the proton sample 26 after the sample is activated by disabling the switch 32 to de-energize the wire 27, it is likely that the tool is malfunctioning. In this situation, the tool is rapidly withdrawn from the borehole 11 for inspection on the earth's surface.

Although the bottle 25 is shown schematically in FIG. 1 for illustrative purposes, a different shape from that which has been shown can be used, if convenient.

What is claimed is:

1. A tool for measuring the magnetically polarizable fluid surrounding a well bore within an earth formation comprising a housing adapted to be moved through the well bore means in said housing for alternately applying a magnetic field to the polarizable fluid, and sensing precession therein, a container within said housing positioned to be within said magnetic field, a magnetically polarizable substance within said container, and circuit means further comprising a conductor within said container for selectively establishing a magnetic field therein to suppress precession signals produced by said magnetically polarizable substance during times in which the earth formation fluids are being polarized.

2. A tool for measuring the magnetically polarizable fluid surrounding a well bore within an earth formation comprising a housing adapted to be moved through the well bore means in said housing for alternately applying a magnetic field to the polarizable fluid and sensing precession therein, a container within said housing positioned to be within said magnetic field, a magnetically polarizable substance within said container, and circuit means comprising a wire grid within said magnetically polarizable substance in said container to selectively polarize said substance and thereby suppress precession signals produced therein during times in which the earth formation fluids are being polarized.

References Cited

UNITED STATES PATENTS

| 3,044,010 | 7/1962 | Jones | 324—0.5 |
| 3,179,878 | 4/1965 | Schwede | 324—0.5 |
| 3,289,072 | 11/1966 | Schuster | 324—0.5 |
| 3,395,337 | 7/1968 | Varian | 324—0.5 |

ARCHIE R. BORCHELT, Primary Examiner

MICHAEL J. LYNCH, Assistant Examiner